United States Patent
Haroun et al.

(10) Patent No.: US 9,789,464 B2
(45) Date of Patent: Oct. 17, 2017

(54) EXCHANGE COLUMN CONTACTOR CONSISTING OF RANDOM PACKING COMPARTMENTS

(71) Applicant: IFP Energies nouvelles, Rueil-Malmaison (FR)

(72) Inventors: Yacine Haroun, Davis, CA (US); Pascal Alix, Roussillon (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 29 days.

(21) Appl. No.: 14/640,231

(22) Filed: Mar. 6, 2015

(65) Prior Publication Data
US 2015/0251154 A1 Sep. 10, 2015

(30) Foreign Application Priority Data
Mar. 10, 2014 (FR) .................................... 14 51925

(51) Int. Cl.
*B01F 3/04* (2006.01)
*B01J 19/30* (2006.01)
(Continued)

(52) U.S. Cl.
CPC .............. *B01J 19/305* (2013.01); *B01D 3/28* (2013.01); *B01D 53/18* (2013.01); *B01F 3/04078* (2013.01); *B01J 19/30* (2013.01); *B01J 19/32* (2013.01); *F25J 3/04909* (2013.01); *F25J 3/04921* (2013.01); *B01J 2219/246* (2013.01); *B01J 2219/3085* (2013.01); *B01J 2219/30223* (2013.01); *B01J 2219/30238* (2013.01); *B01J 2219/32237* (2013.01); *B01J 2219/32268* (2013.01); *B01J 2219/3306* (2013.01); *B01J 2219/3325* (2013.01)

(58) Field of Classification Search
CPC . B01D 3/26; B01D 53/18; B01D 3/28; B01D 59/04; B63B 35/44; B01F 3/04; B01F 3/04078; B01J 19/32
USPC ....................................... 261/94, 96, DIG. 72
See application file for complete search history.

(56) References Cited

U.S. PATENT DOCUMENTS 3,285,587 A * 11/1966 Huber ...................... B01D 3/28
                                                                    202/158
3,402,105 A *  9/1968 Sze .......................... B01D 3/28
                                                                    165/180

(Continued)

FOREIGN PATENT DOCUMENTS

EP      1 478 457 A1    11/2004
EP      2 514 52 A1      4/2012
(Continued)

OTHER PUBLICATIONS

Written Opinion of FR 1451925 dated Oct. 17, 2014.

*Primary Examiner* — Robert A Hopkins
(74) *Attorney, Agent, or Firm* — Fitch, Even, Tabin & Flannery LLP

(57) ABSTRACT

A contactor includes a random packing arrangement in several compartments. The compartments can be delimited by perforated plates or by structured packing walls.
A heat and/or material exchange column is equipped with such a contactor. A floating structure includes such a column. A column equipped with such a contactor can be used for a gas treatment, $CO_2$ capture, distillation or air conversion process.

20 Claims, 5 Drawing Sheets

(51) Int. Cl.
*B01J 19/32* (2006.01)
*B01D 3/28* (2006.01)
*B01D 53/18* (2006.01)
*F25J 3/04* (2006.01)

(56) References Cited

U.S. PATENT DOCUMENTS

| | | | | |
|---|---|---|---|---|
| 3,432,995 | A | * | 3/1969 | Jaeger ................ B01D 53/0423 |
| | | | | 96/126 |
| 4,296,050 | A | | 10/1981 | Meier |
| 5,266,546 | A | * | 11/1993 | Hearn ........................ B01J 8/02 |
| | | | | 203/DIG. 6 |
| 5,393,314 | A | * | 2/1995 | Powell ................... B01D 47/14 |
| | | | | 261/22 |
| 5,486,318 | A | | 1/1996 | McKeigue et al. |
| 5,558,687 | A | * | 9/1996 | Cain ...................... B01D 3/346 |
| | | | | 159/4.01 |
| 5,755,569 | A | | 5/1998 | Berg et al. |
| 5,984,282 | A | | 11/1999 | Armstrong et al. |
| 6,679,537 | B1 | | 1/2004 | Putnam, Jr. |
| 7,559,539 | B2 | | 7/2009 | Zich et al. |
| 7,559,540 | B2 | | 7/2009 | Zich et al. |
| 2002/0038066 | A1 | * | 3/2002 | Strangio ................ B01J 8/0221 |
| | | | | 585/440 |
| 2004/0206289 | A1 | * | 10/2004 | Pollack ................... B63B 29/12 |
| | | | | 114/264 |
| 2006/0244159 | A1 | | 11/2006 | White et al. |
| 2010/0213625 | A1 | | 8/2010 | Raynal et al. |

FOREIGN PATENT DOCUMENTS

| | | |
|---|---|---|
| FR | 2 913 353 A1 | 9/2008 |
| WO | WO-2008/067031 A2 | 6/2008 |

* cited by examiner

EXCHANGE COLUMN CONTACTOR CONSISTING OF RANDOM PACKING COMPARTMENTS

FIELD OF THE INVENTION

The present invention relates to the sphere of offshore gas/liquid contact columns, and more particularly to offshore gas treatment, $CO_2$ capture, dehydration or distillation units.

BACKGROUND OF THE INVENTION

Offshore gas treatment and/or $CO_2$ capture units using amine wash processes comprise liquid or gaseous fluid absorption and regeneration columns. These columns operate under counter-current or co-current gas/liquid flow conditions and they are installed on vessels, floating barges or offshore platforms, of FPSO (Floating Production, Storage and Offloading) type or of FLNG (Floating Liquefied Natural Gas) type for example. Floating barges also comprise distillation columns or dehydration columns.

The columns used in these offshore gas treatment and/or $CO_2$ capture and/or distillation and/or dehydration units are generally based on the principle of a material and/or heat exchange between the gas and the fluid that circulate in the columns. Contacting columns generally consist of a cylindrical enclosure provided with internal contacting elements promoting exchange between the fluids. The contacting elements (contactor) that increase the contact surface area can be structured packings, random packings or trays. FIG. 1 shows a particular case of a gas treatment column (1) equipped with a distributor tray at the column top. In this example, the gas (G) and the liquid (L) circulate in a counter-current flow. Conventionally, this gas treatment column (1) comprises several sections 3 filled by a contactor, and a distributor tray 2 is arranged above each contactor 3. The gas/liquid contactor contacts gas G with liquid L so as to allow exchanges.

The gas/liquid contact columns considered are placed on floating structures, of vessel, platform or barge type for example, sensitive to the wave motion. The equipments installed on these units, notably the gas/liquid distributor trays and the contactors, therefore undergo wave motions up to six degrees of freedom (yaw, pitch, roll, heave, sway, thrust).

By way of indicative information, the angle associated with the combination of the pitch and roll oscillations is of the order of +/−5° with a period ranging from 15 to 20 s. The orders of magnitude of the longitudinal, transverse and vertical accelerations encountered in the column respectively range between 0.24/0.76/0.25 m/s² 6 m above the deck where the column is arranged and 0.33/1.28/0.33 m/s² 50 m above the deck. Under such conditions, the operation of conventional contact columns can be greatly disturbed. Indeed, under the effect of the wave motion, the inclination of the column degrades the homogeneity of the phase distribution in the column section.

If it is not controlled, this poor distribution in the packing bed can substantially degrade the performances of the contact column. In order to avoid this type of problem, various suitable structured packing piles have been developed.

For example, patent application U.S. Pat. No. 5,486,318 discloses contactor embodiments with partitioning of the packing section. In a first embodiment, the packing section is partitioned by perforated walls. The column is thus made up of several compartments equipped with structured packings. In a second embodiment, each packing section is perpendicularly adjacent to the other section, thus the total section of the column is made up of a multiplicity of structured packing sections.

Furthermore, patent application U.S. Pat. No. 5,984,282 discloses a contactor embodiment where, in the axial direction of the column, the structured packing elements are arranged in such a way that each packing section assembly surrounds a central packing section body. However, this implementation is complex.

Besides, patent applications U.S. Pat. Nos. 7,559,539 and 7,559,540 disclose contactor embodiments where the packing bed consists of two packing types with different geometric areas. The packing beds having different areas can be superimposed in the axial direction of the column or in the radial direction according to the patent. In patent applications U.S. Pat. Nos. 7,559,539 and 7,559,540, the section of the column is not split into several packing sections, therefore, under the action of the three-dimensional wave motion, the embodiments do not allow to prevent lateral displacement of the liquid in all directions. These embodiments do therefore not provide good distribution of the liquid and vapour phases in an offshore environment.

These solutions are generally implemented by means of structured packings that afford the advantage of being less sensitive to the marine environment than random packings. Now, random packings also involve interesting qualities in terms of transfer efficiency, low pressure drop and ease of installation.

The present invention allows to overcome the drawback related to the use of random packings in offshore contact columns. The contactor according to the invention comprises a random packing arrangement in several compartments, which allows to provide good distribution homogeneity in the contact column and thus to benefit from the advantages provided by random packings in a marine environment. The compartments are delimited by walls consisting of perforated plates or structured packings. The invention then allows to ensure smooth operation of the column, notably in case of inclination of the column, whatever the direction of inclination thereof.

SUMMARY OF THE INVENTION

The invention relates to a contactor for a column intended for heat and/or material exchange between two fluids, said contactor comprising a random packing. Said random packing is distributed among several compartments delimited by at least one wall.

According to the invention, said compartments are substantially parallelepipedic, cylindrical, prismatic and/or they have the shape of cylinder portions.

Advantageously, at least one wall consists of structured packing.

Preferably, the specific geometric surface area of said structured packing ranges between 125 and 750 m²/m³, and it is preferably substantially equal to 250 m²/m³.

Furthermore, at least one wall can be a perforated plate.

According to one embodiment of the invention, said compartments being substantially parallelepipedic, said walls form, in a horizontal plane, substantially perpendicular bands.

Alternatively, said compartments being substantially cylindrical, said walls form, in a horizontal plane, substantially concentric circles.

Advantageously, the periphery of said contactor is formed by a structured packing wall.

Furthermore, the invention relates to a column intended for heat and/or material exchange between a gas and a liquid, wherein the two fluids are contacted by means of at least one contactor according to the invention.

The invention also relates to a floating structure, notably for hydrocarbon recovery. It comprises at least one column intended for heat and/or material exchange between a gas and a liquid according to the invention.

Moreover, the invention relates to the use of a column according to the invention for a gas treatment, $CO_2$ capture, distillation or air conversion process.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION

Figure 1:
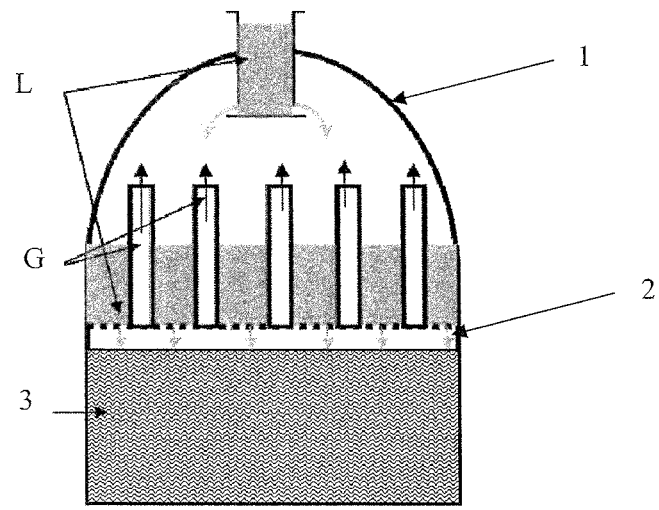
FIG. 1, already described, illustrates the particular case of a gas treatment or $CO_2$ capture column equipped with a distributor tray at the column top.

The invention relates to a contactor for a column intended for heat and/or material exchange between two fluids. A contactor is an element allowing two fluids to be contacted so as to promote heat and/or material exchanges between the two fluids. The contactor according to the invention comprises several compartments containing each random packings.

What is referred to as random packing is made up of anarchic and random piles of unit elements with particular shapes, for example rings, spirals, etc. Heat and/or material exchanges occur within these unit elements. The elements can be made of metal, ceramic, plastic or similar materials. Patent applications EP-1,478,457 and WO-2008/067,031 describe two examples of random packing unit elements. Random packing involves interesting qualities in terms of transfer efficiency, low pressure drop and ease of installation.

According to the invention, the contactor comprises a plurality of compartments containing each random packings. The basic principle of the invention is to divide the random packing bed in the axial direction of the column, i.e. the axial direction of the contactor, into several random packing compartments. The compartments are delimited by walls made up of perforated plates and/or of structured packings. The walls are substantially parallel to the axis of the contactor, corresponding substantially to the axis of the column and the axis of the random packing bed. Splitting the random packing section into several beds (compartments) delimited by a wall (perforated plate and/or structured packing) allows to prevent massive liquid displacement laterally or the formation of preferred paths for the liquid in the packing, under the effect of the inclination of the column, notably due to a motion related to swell. Indeed, the wall (perforated plate and/or structured packing) allows to attenuate/slow down the inertia and the lateral displacement of the liquid and vapour phases, thus providing good phase distribution homogeneity and uniformity in the packing bed. Moreover, as the inclination of the column can also cause displacement of the random packing, the compartments allow this displacement of the random packing to be limited.

Advantageously, the compartments are substantially parallelepipedic, cylindrical, prismatic, or they have the shape of a cylinder portion. Advantageously, each compartment is surrounded by a wall (perforated plate and/or structured packing). When a compartment is arranged on the periphery of the contactor, it is surrounded by a perforated plate and/or by a wall made up of structured packings and by the column (column shell). The layout of the contactor in form of compartments allows to attenuate/slow down the inertia and the displacement of the fluids in all directions.

According to a first embodiment, the compartments are delimited only by perforated plates. For this embodiment with random packing sections delimited by a perforated plate, the perforations allow to balance the pressure on either side of the wall and thus between the various compartments. The perforated plates are made of metal for example.

Figure 2:
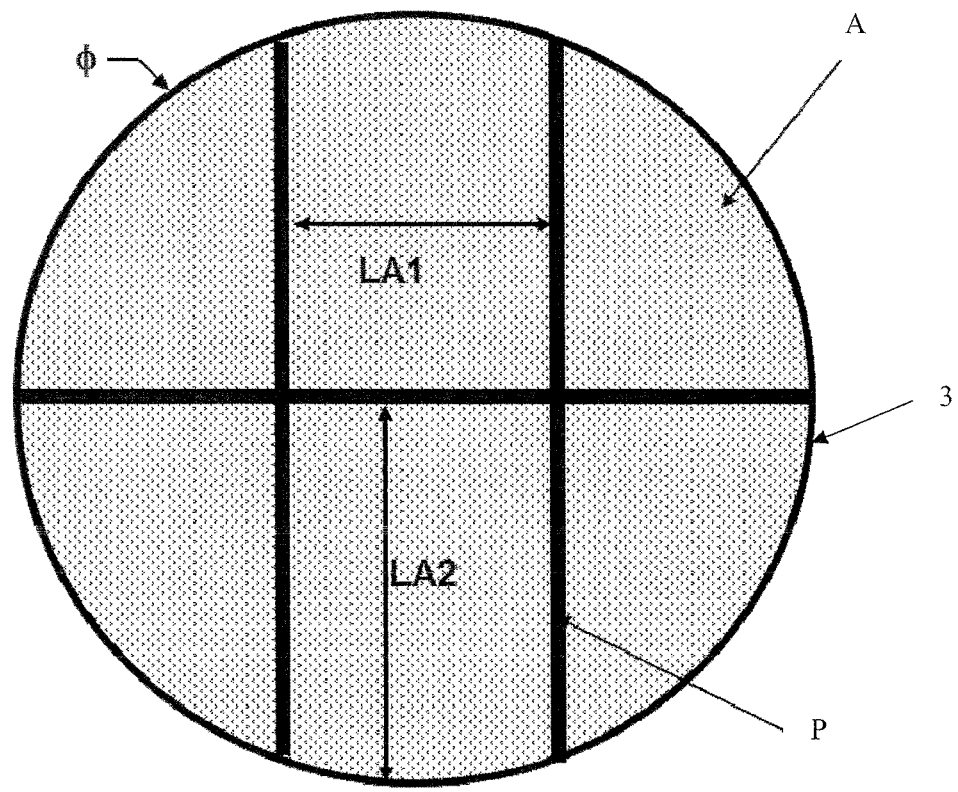
FIGS. 2 to 4 illustrate different variant embodiments of the arrangement of the compartments delimited by perforated plates, for a contactor according to the invention.
Figure 3:
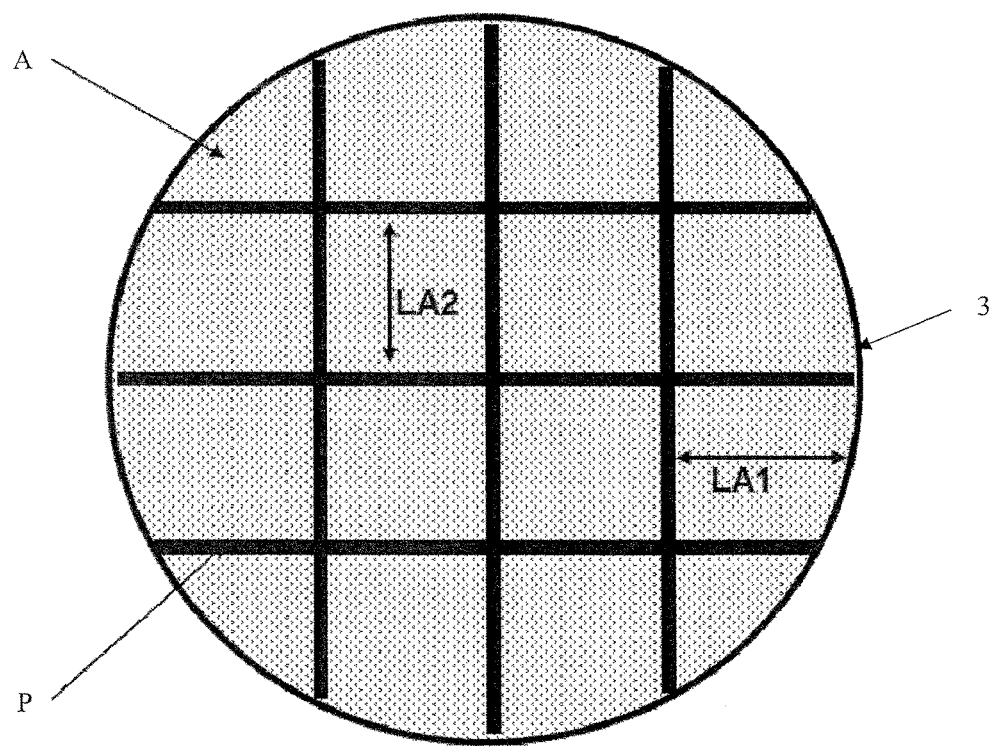
Figure 4:
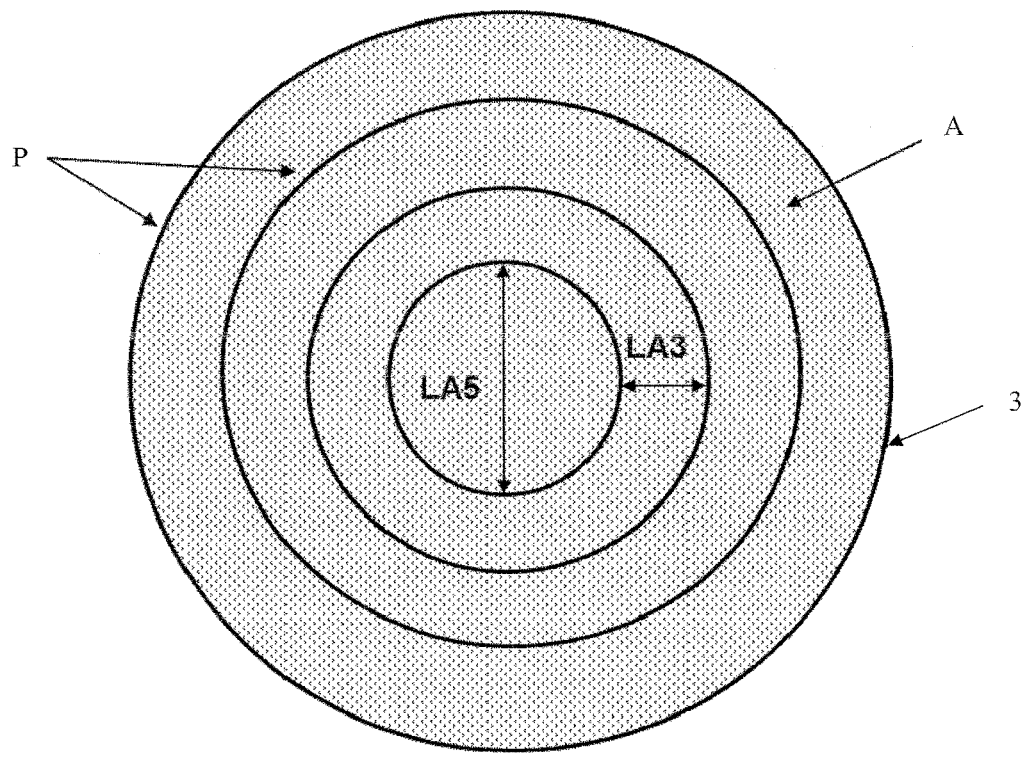

FIGS. 2 to 4 show different variants of the first embodiment of the invention (with perforated plates). These figures correspond to views in the horizontal plane of the structured packing arrangement. In these figures, the random packing is denoted by A and the perforated plates by P.

For the variant embodiments of FIGS. 2 and 3, the compartments are substantially parallelepipedic. As illustrated, the perforated plates are arranged along two directions in the horizontal plane. These two directions are substantially perpendicular to one another. For these variant embodiments, each compartment of the random packing A is surrounded by perforated plates and optionally by the contour of column $\phi$. The example of FIG. 3 comprises more blocks than the example of FIG. 2, therefore this variant is more suited for large-diameter columns or columns subjected to greater inclinations. According to one aspect of these variant embodiments, the diameter of column $\phi$ ranges between 0.5 and 10 m, and the dimensions of the compartments of random packing A, LA1 and LA2, range between 0.2 and 5 m.

For the variant of FIG. 4, the compartments are substantially cylindrical. As illustrated, the perforated plates form concentric circles in the horizontal plane. The spacing between two consecutive walls can be substantially identical. For this variant, each random packing compartment A, substantially forming a crown, is surrounded by perforated plates and optionally by the contour of column $\phi$. According to one aspect of this variant embodiment, the diameter of column $\phi$ ranges between 0.5 and 10 m, and the dimensions of random packing compartments A: LA3 ranges between 0.2 and 5 m, and LA5 ranges between 0.1 and 2.5 m.

According to a second embodiment of the invention, the compartments are delimited by structured packing walls. This configuration allows to combine the advantages specific to each packing: random and structured, and to provide good distribution homogeneity and uniformity in the heat and/or material exchange column.

What is referred to as structured packing is a pile of corrugated plates or folded sheets arranged in an organized manner in form of large blocks as described notably in patent applications FR-2,913,353 (US-2010/0,213,625), U.S. Pat. Nos. 3,679,537 and 4,296,050. The plates that make up the structured packing comprise, in the transverse plane, a principal direction. The principal direction thus is a direction perpendicular to the vertical axis, defined by the structure of the plates. Structured packings afford the advantage of providing a large geometric area for a given representative diameter.

According to the invention, a contactor comprising structured packings comprises several structured packing layers piled one above the other. In order to promote exchanges between the fluids, the layers of the contactor have different principal directions, they are preferably substantially perpendicular to one another. The height of the layers can range between 0.1 and 0.3 m, and it is preferably equal to 0.21 m.

The specific geometric surface area of a structured packing corresponds to the total area developed by the packing, this surface area being expressed as the geometric surface area of the packing available per volume unit. Conventionally, structured packings can develop specific geometric surface areas ranging between 100 and 750 $m^2/m^3$. As a result of their geometric layout, structured packings develop specific surface areas that are larger than those of random packings, with the same hydraulic capacity. For this embodiment of the invention, the specific geometric surface area of the structured packing ranges between 125 and 750 $m^2/m^3$, and it is preferably equal to 250 $m^2/m^3$.

Since the specific surface area of the structured packing is larger than that of the random packing, the structured packing walls that delimit the random packing compartments attenuate/slow down the inertia and the lateral displacement of the liquid and vapour phases, thus providing good phase distribution homogeneity and uniformity in the packing bed.

FIGS. 5 to 10 show different variants of the second embodiment of the invention (with structured packing walls). These figures correspond to views in the horizontal plane of the structured packing arrangement. In these figures, the random packing is denoted by A and the structured packing by B.

Figure 5:
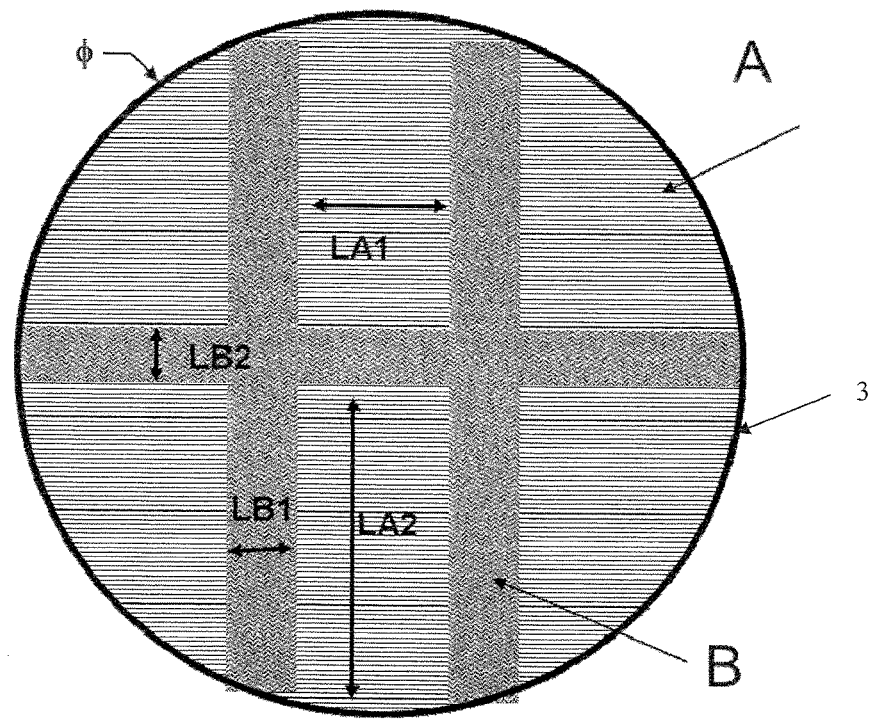
FIGS. 5 to 10 illustrate different variant embodiments of the arrangement of the compartments delimited by structured packing, for a contactor according to the invention.
Figure 6:
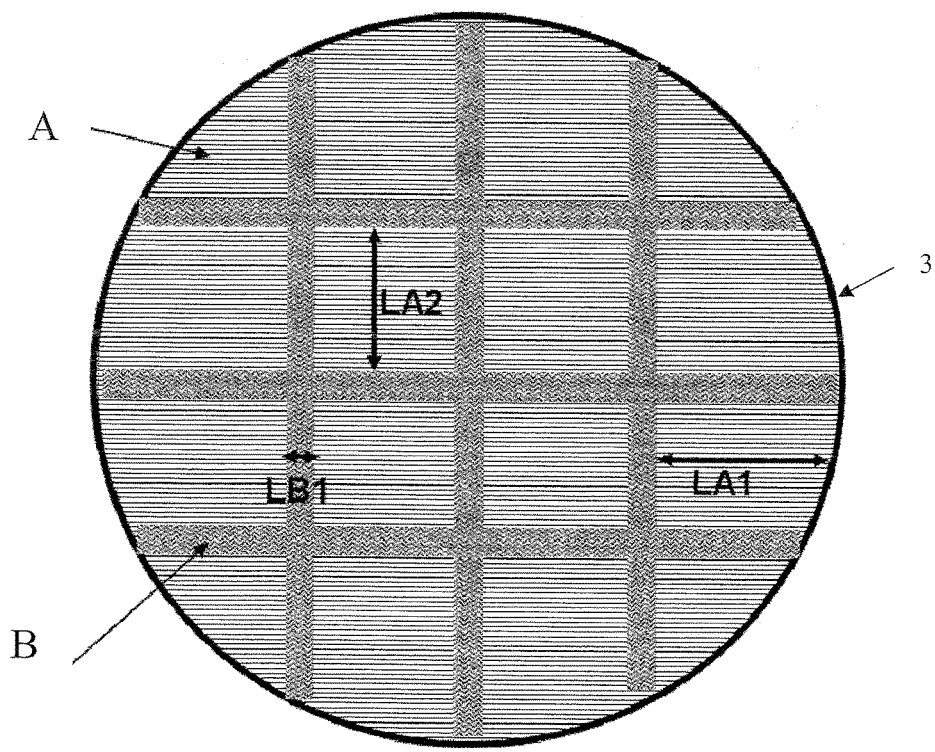

For the variants of FIGS. 5 and 6, the compartments are substantially parallelepipedic. Furthermore, the walls made up of structured packing B substantially have the shape of bands (i.e. whose width is much smaller than the length in the horizontal plane). As illustrated, the bands are arranged along two directions in the horizontal plane. These two directions are substantially perpendicular to one another. For these variants, each random packing compartment A is surrounded by structured packing bands B and optionally by the contour of column $\phi$. The example of FIG. 6 comprises more blocks than the example of FIG. 5, therefore this variant embodiment is more suited for large-diameter columns or columns subjected to greater inclinations. According to one aspect of these variant embodiments, the diameter of column $\phi$ ranges between 0.5 and 10 m, the dimensions of the random packing compartments A, LA1 and LA2, range between 0.2 and 5 m, and the dimensions of the structured packing bands B, LB1 and LB2, range between 0.1 and 2.5 m. For example, for the embodiment of FIG. 6, the dimensions can be selected as follows: the diameter of column $\phi$ is 4 m, the dimensions of random packing compartments A, LA1 and LA2, are 0.75 m, and the dimensions of the structured packing bands B, LB1 and LB2, are 0.2 m.

Figure 7:
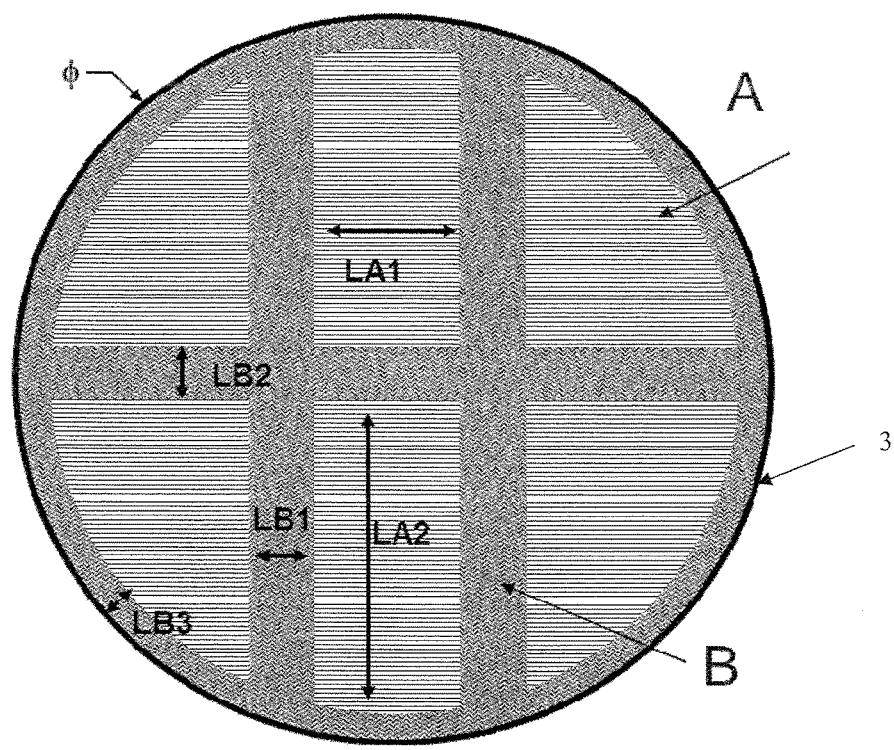
Figure 8:
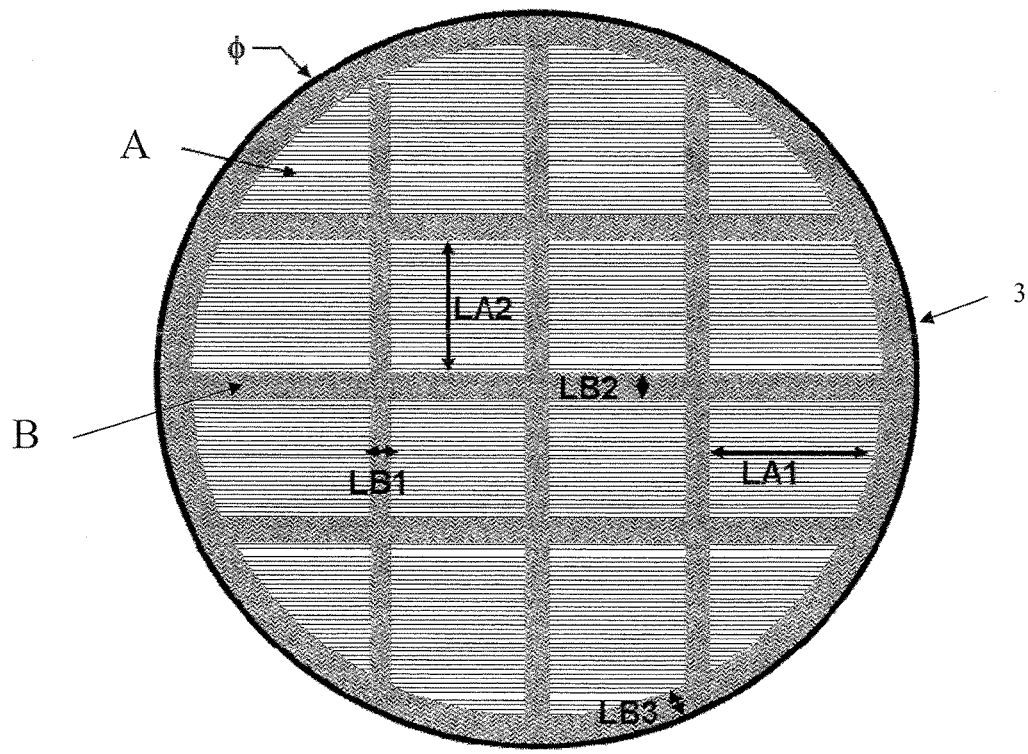

The variant embodiments of FIGS. 7 and 8 correspond to the variants of FIGS. 5 and 6 where the periphery of the contactor is made up of structured packing B. Arranging a block of the second structured packing on the periphery notably allows to prevent liquid accumulation on the wall of the column. The walls made up of structured packing B substantially have the shape of bands. As illustrated, the bands are arranged along two directions in the horizontal plane. These two directions are substantially perpendicular to one another. For these variants, each random packing compartment A is surrounded only by structured packing walls B. The example of FIG. 8 comprises more blocks than the example of FIG. 7, therefore this variant embodiment is more suited for large-diameter columns or for columns subjected to greater inclinations. For example, the diameter of column $\phi$ ranges between 0.5 and 10 m, the dimensions of the random packing compartments A, LA1 and LA2, range between 0.2 and 5 m, the dimensions of the structured packing bands B, LB1 and LB2, range between 0.1 and 2.5 m, and the dimension of the peripheral wall LB3 ranges between 0.1 and 2.5 m.

Figure 9:
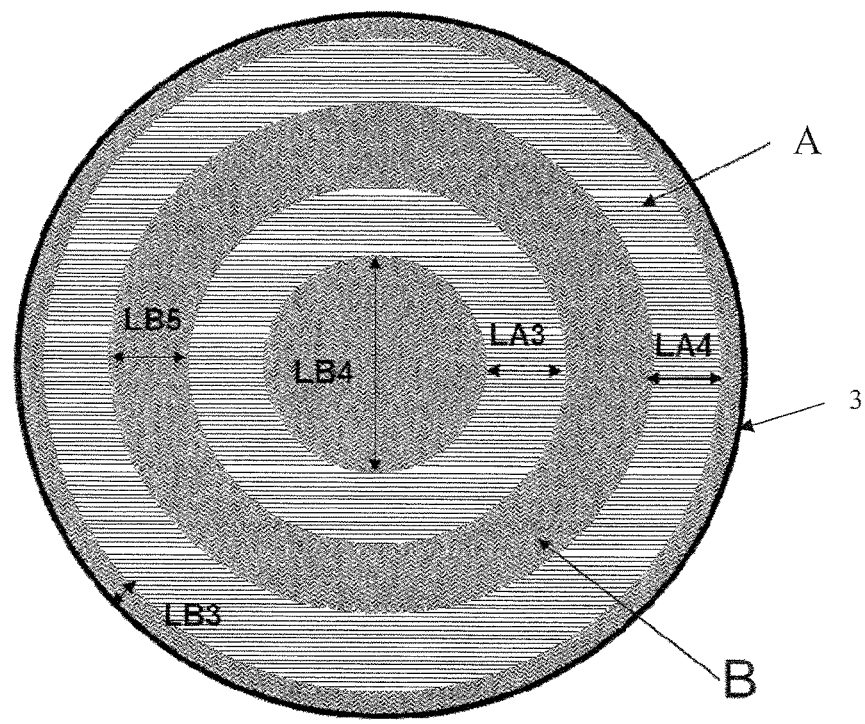

For the variant of FIG. 9, the compartments are substantially cylindrical (tubular) in the horizontal plane: the arrangement of the random and structured packings forms a set of concentric circles where random packing compartments A alternate with structured packing walls B. For this variant embodiment, the center of the contactor is made up of structured packing B and the contactor comprises a peripheral wall consisting of structured packing B. Each random packing compartment A is thus surrounded by structured packing B. For example, the diameter of column $\phi$ ranges between 0.5 and 10 m, the dimensions of the random packing compartments A, LA3 and LA4, range between 0.2 and 2.5 m, the dimensions of the structured packing walls B, LB4, range between 0.2 and 1 m, LB5 and LB6 range between 0.1 and 2.5 m, and the dimension of peripheral block LB3 ranges between 0.1 and 2.5 m.

Figure 10:
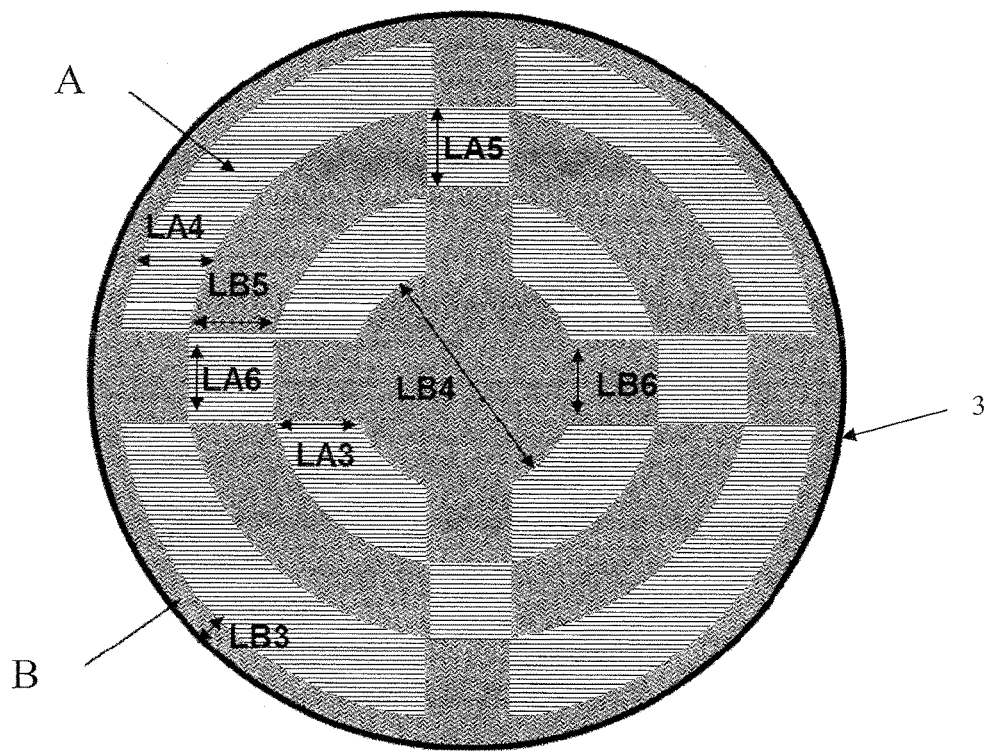

For the variant embodiment of FIG. 10, the majority of the random packing compartments and of the walls made up of structured packing are substantially cylindrical (tubular) or they have the shape of a cylinder (or tube) portion, and a minority of the compartments and of the walls are substantially rectangular in the horizontal plane. The arrangement of the random and structured packings forms a set of concentric portions of circles (substantially quarter circles for example) where random packings A alternate with structured packings B. Furthermore, the arrangement comprises some rectangles. This arrangement forms an alternation of packings A and B. For this variant, the center of the contactor is made up of structured packing B and the contactor comprises a peripheral wall consisting of structured packing B. Each random packing compartment A is thus surrounded by structured packing walls B. The example of FIG. 10 comprises more compartments than the example of FIG. 9, therefore this variant embodiment is more suited for large-diameter columns or columns subjected to greater inclinations. For example, the diameter of column $\phi$ ranges between 0.5 and 10 m, the dimensions of the random packing compartments A, LA3, LA4, LA6, range between 0.2 and 2.5 m, the dimensions of the structured packing walls B, LB4, range between 0.2 and 1 m, LB5 and LB6 range between 0.1 and 2.5 m, and the dimension of peripheral wall LB3 ranges between 0.1 and 2.5 m.

These embodiments allow to provide a simple arrangement, which notably enables to simplify the setting, in practice, of the packing elements in the contact column while providing homogenous distribution of the fluids.

Furthermore, other embodiments can be considered, for example by defining substantially triangular blocks by means of walls and/or bands made of packing B and oriented at 45° with respect to one another, or using the arrangement of FIGS. 9 and 10 while removing the peripheral structured packing wall, or by combining the use of perforated plates and structured packing to delimit the compartments.

The invention also relates to a column 1 intended for material and/or heat exchange between two fluids wherein two fluids are contacted by means of at least one gas/liquid contactor 3, said column 1 comprising at least a first inlet for a liquid fluid, at least a second inlet for a gaseous fluid, at least a first outlet for a gaseous fluid and at least a second outlet for a liquid fluid. According to the invention, the contactor is as described above. Furthermore, column 1 can comprise at least one distributor tray 2 allowing distribution of the fluids onto contactor 3.

The gas and the liquid can circulate in the column in a counter-current or co-current flow.

Furthermore, the invention relates to a floating structure such as a platform, a vessel, a barge for example of FPSO or FLNG type, notably for hydrocarbon recovery. The floating structure comprises at least one hydrocarbon treating unit including at least one material and/or heat exchange column according to the invention.

The column according to the invention can be used in gas treatment, $CO_2$ capture (amine wash for example), distillation or air conversion processes.

Furthermore, the invention can be used with any solvent type.

The invention claimed is:

1. A column intended for heat and/or material exchange between two fluids, the column comprising:
    at least one contactor comprising a random packing made up of anarchic and random piles of unit elements, said random packing being distributed among several compartments delimited by at least one wall splitting the random packing in the axial direction of contactor, the at least one wall is configured to allow and attenuate lateral displacement of the two fluids, wherein at least one wall consists of a structured packing; and
    at least one distributor tray for distributing of fluid onto the contactor.

2. The column as claimed in claim 1, wherein the specific geometric surface area of said structured packing ranges between 125 and 750 $m^2/m^3$.

3. The column as claimed in claim 1, wherein the specific geometric surface area of said structured packing is equal to 250 $m^2/m^3$.

4. The column as claimed in claim 1, wherein the at least one distributor tray and the at least one contactor are vertically arranged.

5. A floating structure for hydrocarbon recovery, characterized in that it comprises at least one column intended for heat and/or material exchange between a gas and a liquid as claimed in claim 1.

6. A floating structure, characterized in that it comprises at least one column intended for heat and/or material exchange between a gas and a liquid, the column comprising:
    at least one contactor comprising a random packing made up of anarchic and random piles of unit elements, said random packing being distributed among several compartments delimited by at least one wall splitting the random packing in the axial direction of contactor, the at least one wall is configured to allow and attenuate lateral displacement of the two fluids; and
    at least one distributor tray for distributing of fluid onto the contactor.

7. A column intended for heat and/or material exchange between two fluids, the column comprising:
    at least one contactor comprising a random packing made up of anarchic and random piles of unit elements, said random packing being distributed among several compartments delimited by at least one wall splitting the random packing in the axial direction of contactor, the at least one wall is configured to allow and attenuate lateral displacement of the two fluids; and
    at least one distributor tray for distributing of fluid onto the contactor, wherein the at least one distributor tray is vertically arranged over the at least one contactor, and has a first set openings configured to distribute liquid downwardly onto the contactor and a second set of openings configured to allow gas from the contactor to flow upwardly out of the contactor.

8. The column as claimed in claim 7, wherein said compartments are substantially parallelepipedic, cylindrical, prismatic and/or they have the shape of cylinder portions.

9. The column as claimed in claim 7, wherein at least one wall is a perforated plate.

10. The column as claimed in claim 7 wherein, said compartments being substantially parallelepipedic, said walls form, in a horizontal plane, substantially perpendicular bands.

11. The column as claimed in claim 7, wherein, said compartments being substantially cylindrical, said walls form, in a horizontal plane, substantially concentric circles.

12. The column as claimed in claim 7, wherein the periphery of said at least one contactor is formed by a structured packing wall.

13. A floating structure for hydrocarbon recovery, characterized in that it comprises at least one column intended for heat and/or material exchange between a gas and a liquid as claimed in claim 7.

14. A process for using the column as claimed in claim 7, comprising performing gas treatment in the column.

15. A process for using the column as claimed in claim 7, comprising performing $CO_2$ capture in the column.

16. A process for using the column as claimed in claim 7, comprising performing distillation in the column.

17. A process for using the column as claimed in claim 7, comprising performing an air conversion process in the column.

18. The column as claimed in claim 7, wherein at least one wall consists of a structured packing.

19. The column as claimed in claim 18, wherein the specific geometric surface area of said structured packing ranges between 125 and 750 $m^2/m^3$.

20. The column as claimed in claim 18, wherein the specific geometric surface area of said structured packing is equal to 250 $m^2/m^3$.

* * * * *